Figure 1:
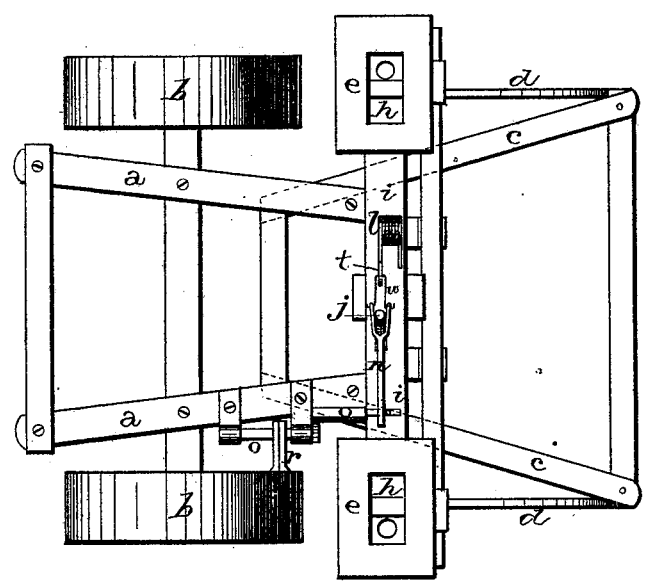
Figure 2:
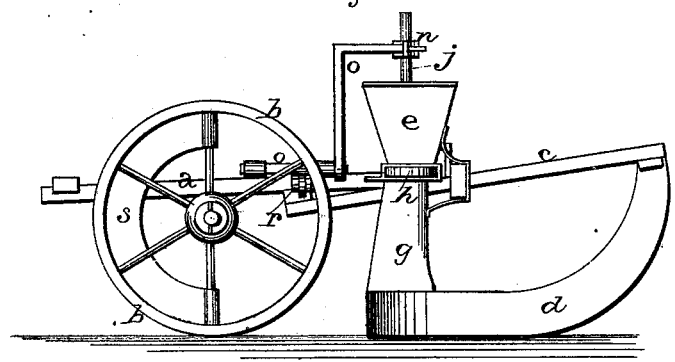
Figure 3:
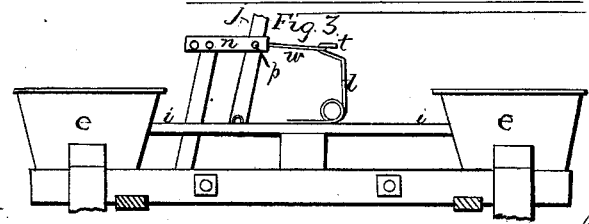

J. LEIMBACH & G. H. WILSON.
Corn-Planter.

No. 205,878.      Patented July 9, 1878.

WITNESSES.  
INVENTORS.  
Jacob Leimbach &  
Geo. H. Wilson,  
per  
F. A. Lehmann, Atty.

UNITED STATES PATENT OFFICE.

JACOB LEIMBACH AND GEORGE H. WILSON, OF OSKALOOSA, IOWA.

IMPROVEMENT IN CORN-PLANTERS.

Specification forming part of Letters Patent No. 205,878, dated July 9, 1878; application filed December 14, 1877.

*To all whom it may concern:*

Be it known that we, JACOB LEIMBACH and GEORGE H. WILSON, of Oskaloosa, in the county of Mahaska and State of Iowa, have invented certain new and useful Improvements in Corn-Planters; and we do hereby declare the following to be a full, clear, and exact description of the invention, such as will enable others skilled in the art to which it pertains to make and use it, reference being to the accompanying drawings, which form part of this specification.

Our invention relates to an improvement in corn-planters; and it consists in the arrangement and combination of parts, whereby the seed-slide is operated by means of a cam or cams placed upon one of the driving-wheels.

The accompanying drawings represent our invention.

$a$ represents the rear part of the frame, which is supported upon the two driving-wheels $b$; and $c$ the front portion of the frame, which is supported upon the two furrow-openers $d$. These two frames are pivoted together in the usual manner.

The seed-boxes $e$ are placed just over the top of the grain-spouts $g$, and the seed-slide $h$ moves back and forth between the two boxes, as shown, so as to drop seed from both boxes at the same time. Passing down through this seed-slide, and through the board $i$ placed just above it, is the operating lever $j$, by means of which the slide can be operated, either by hand or automatically, as the machine moves forward. To one side of this lever is fastened the spring $l$, which serves to draw it back into position after it has been once moved. Projecting from the opposite side of this lever is a rod or bar, $n$, through which are made a series of holes for the purpose of adjusting the distance which the lever shall throw, and the quantity of seed which will be discharged by the seed-slide. Passing through one of the holes in this bar $n$ is one end of the bent operating-lever $o$, the lower portion of which forms a partially-revolving shaft, that is journaled upon the top of one side of the frame $a$.

Projecting outward from this partially-revolving shaft is an arm, $r$, carrying a friction-roller, which arm serves to strike against the cam $s$ placed upon, and extending about half-way around the wheel. As the wheel revolves this cam strikes against the outer end of this arm $r$, and forces it downward, thereby moving the operating-lever far enough to one side to operate the seed-slide.

The bar $n$ is forked at its inner end, and straddles the hand-lever $j$, to which it is pivoted by means of a bolt or pin, $p$. On this pin is hung a bail or link, $w$, in which is connected a hook, $t$, formed on the end of the spring $l$. By this means the spring can easily and quickly be detached for throwing the machine out of gear, and for operating it by hand when desired.

It will readily be seen that when the spring is connected to the link $w$ the arm $r$, with its friction-roller, is held against the side of the wheel, and the machine will be operated by the cam or cams on said wheel, while, as soon as the spring is disconnected from said link, the arm $r$ will not be held against the side of the wheel.

The cam $s$ is here shown as extending half-way around the wheel, which will cause the slide to operate twice for every revolution of the wheel; but it is evident that the number of these cams may be increased as desired, so as to cause the machine to drop as often as possible.

The arrangement of parts herein described is exceedingly simple, requires but little power to operate, and enables the driver to either operate the slide by hand by disconnecting the operating-lever, or cause the forward motion of the machine to do the planting, as he may prefer.

We are aware that it is not new in a seed-planter to retract the dropping-slide by a spring; and we do not, therefore, claim such, broadly, as our invention; neither do we claim, broadly, the idea of operating the seed-slide from one of the driving-wheels by means of cams attached to it, as we are aware that such is not new; but we are not aware that the construction and arrangement of the intermediate mechanism as herein shown and described has ever before been known.

Having thus described our invention, we claim—

The combination of the upright pivoted hand-lever $j$, perforated bar $n$, link $w$, spring $l$, having hook $t$, and the crank-lever $o$, having arm $r$, carrying a friction-roller, with the seed-slide, and one or more cams on the side of the driving-wheel, all constructed substantially as and for the purposes herein set forth.

In testimony that we claim the foregoing we have hereunto set our hands this 7th day of December, 1877.

JACOB LEIMBACH.
GEO. H. WILSON.

Witnesses:
C. P. COXE,
WM. KENNEDY.